(12) United States Patent
Nash et al.

(10) Patent No.: US 10,503,687 B2
(45) Date of Patent: Dec. 10, 2019

(54) MULTI-HOST PERIPHERAL COMPONENT INTERCONNECT EXPRESS (PCIE) SWITCHING BASED ON INTERRUPT VECTOR FROM PCIE DEVICE

(71) Applicant: Western Digital Technologies, Inc., San Jose, CA (US)

(72) Inventors: Berck Nash, Divide, CO (US); Michael Walker, Colorado Springs, CO (US); Randall Hess, Colorado Springs, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 223 days.

(21) Appl. No.: 15/490,490

(22) Filed: Apr. 18, 2017

(65) Prior Publication Data

US 2018/0300283 A1    Oct. 18, 2018

(51) Int. Cl.
*G06F 13/00* (2006.01)
*G06F 13/42* (2006.01)
*G06F 13/24* (2006.01)
*G06F 13/40* (2006.01)

(52) U.S. Cl.
CPC .......... *G06F 13/4282* (2013.01); *G06F 13/24* (2013.01); *G06F 13/404* (2013.01); *G06F 13/4022* (2013.01)

(58) Field of Classification Search
CPC .................................................. G06F 13/4282
See application file for complete search history.

(56) References Cited

U.S. PATENT DOCUMENTS

| 8,463,934 | B2 | 6/2013 | Maitra |
| 8,806,098 | B1 | 8/2014 | Mandapuram et al. |
| 8,917,734 | B1 | 12/2014 | Brown |
| 9,959,224 | B1 * | 5/2018 | Serebrin ................. G06F 13/24 |
| 10,210,123 | B2 * | 2/2019 | Olarig ................. G06F 13/1668 |
| 2008/0091915 | A1 * | 4/2008 | Moertl ................. G06F 12/1081 711/206 |
| 2009/0248947 | A1 | 10/2009 | Malwankar et al. |
| 2013/0024595 | A1 * | 1/2013 | Subramaniyan ........ G06F 13/28 710/308 |
| 2014/0181354 | A1 | 6/2014 | Yi et al. |
| 2014/0337540 | A1 | 11/2014 | Johnson et al. |
| 2015/0356038 | A1 | 12/2015 | Feehrer et al. |

FOREIGN PATENT DOCUMENTS

CN            104572508 A      4/2015

* cited by examiner

*Primary Examiner* — Tammara R Peyton

(57) ABSTRACT

Described herein are enhancements for managing multi-host Peripheral Component Interconnect Express (PCIe) switching. In one implementation, a system includes one or more PCIe devices and a PCIe switch configured to receive a first interrupt corresponding to a first interrupt vector from a PCIe device, wherein the first interrupt vector comprises at least a virtual address and a first data value. The switch is further configured to translate the first interrupt vector into a second interrupt vector, wherein the second interrupt vector comprises a second address and a second data value, and transfer a second interrupt using the second interrupt vector to a host of a plurality of hosts that corresponds to the second interrupt vector.

20 Claims, 6 Drawing Sheets

US 10,503,687 B2

MULTI-HOST PERIPHERAL COMPONENT INTERCONNECT EXPRESS (PCIE) SWITCHING BASED ON INTERRUPT VECTOR FROM PCIE DEVICE

BACKGROUND

Peripheral Component Interconnect Express (PCIe) is a high-speed serial computer expansion bus standard that is used to communicate between a host processing system and an expansion device. These expansion devices may comprise networking devices, storage devices, graphics processing devices, among other possible devices. To provide the communications, packets are transferred to and from the host processing system to provide the desired functionality. For example, when data is requested from a PCIe storage device, one or more packets are transferred to the host computing system over the PCIe lanes to the host processing system.

In some implementations, in signaling the host processing system of a particular event, the PCIe devices may be configured with interrupt vectors that are used in notifying the host when a communication is required. These interrupt vectors often include a data portion and an address to be written to. Accordingly, when an interrupt vector is received, the host may identify the address and the corresponding data and determine the source, and in some examples type, of the interrupt before providing any required operations associated with the interrupt. However, although interrupt vectors are useful when a single host is connected to a PCIe device, issues can arise when multiple hosts are desired to be connected to the same PCIe device.

OVERVIEW

Examples disclosed herein provide enhancements for managing multi-host Peripheral Component Interconnect Express (PCIe) switching. In one implementation, a computing apparatus comprises a computing apparatus with computer readable storage media and a processing system. The computing apparatus further includes program instructions stored on the computer readable storage media that provide PCIe switching functionality that, when executed by the processing system, direct the processing system to receive a first interrupt corresponding to a first interrupt vector from a PCIe device, wherein the first interrupt vector comprises at least a virtual address and a data value. The program instructions further direct the processing system to translate the first interrupt vector into a second interrupt vector, wherein the second interrupt vector comprises a second address and a second data value, and transfer a second interrupt using the second interrupt vector to a host of a plurality of hosts that corresponds to the second interrupt vector.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only to the claims and their equivalents.

DETAILED DESCRIPTION

Figure 1:
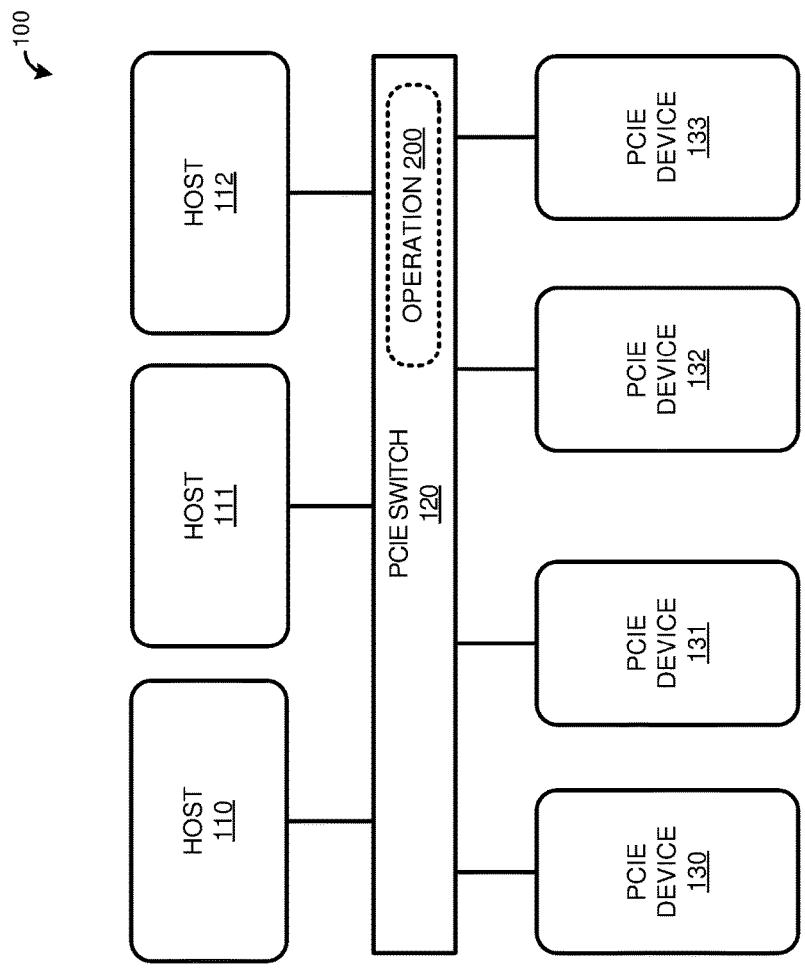
FIG. 1 illustrates a computing environment to provide Peripheral Component Interconnect Express (PCIe) switching for a plurality of hosts according to an implementation.

FIG. 1 illustrates a computing environment 100 to provide Peripheral Component Interconnect Express (PCIe) switching for a plurality of hosts according to an implementation. Computing environment 100 includes hosts 110-112, PCIe switch 120, and PCIe devices 130-131. PCIe switch 120 is configured to provide operation 200 to manage interrupts from PCIe devices 130-133 to hosts 110-112.

In operation, hosts 110-112 may execute various applications and processes that require operations with PCIe devices 130-133. These operations may include transferring data as packets to the devices, receiving data as packets from the devices, or some other similar functionality. PCIe devices 130-133 may comprise data storage devices, such as Non-Volatile Memory express (NVMe) devices, networking devices, such as a network interface card (NIC), a graphics processing unit (GPU), or some other PCIe device.

To provide the operations with the PCIe devices, PCIe switch 120 is provided that is used to ensure that each PCIe device of PCIe devices 130-133 is capable of providing interrupts to the required host. For example, when PCIe device 133 requires an interrupt of host 110, PCIe switch 120 may identify the request, identify the appropriate host for the communication, and forward the interrupt to the appropriate host. In providing this forwarding mechanism, PCIe switch 120 may maintain one or more data structures that can be used to store interrupt vectors provided from each host in hosts 110-112, wherein the interrupt vectors are used to identify interrupts from each PCIe device. For example, when coupled to PCIe switch 120, host 110 may provide interrupt vectors for each PCIe device of PCIe devices 130-133 to communicate with host 110. These interrupt vectors each include an address (memory address) on the host and a data value, such that when an interrupt is required a PCIe device may write to the address with the specified data value.

In addition to maintaining the data structure for the interrupt vectors provided from hosts 110-112, PCIe switch 120 may further provide, for each interrupt vector in the plurality of interrupt vectors configured by the plurality of hosts, a virtual interrupt vector to a corresponding PCIe device. These virtual interrupt vectors, similar to the interrupts from hosts 110-112, may include an address portion and a data portion, wherein the address does not reflect the address provided from the individual hosts. For example, if host 110 provided an address "FFEE0000" with a data value of "4A00" to be used by PCIe device 130, then PCIe switch 120 may identify a virtual interrupt vector with a virtual address, such as "BBB80000," and provide the virtual interrupt vector to the PCIe device. Accordingly, rather than requiring the individual PCIe device to manage interrupt vectors for each of the hosts, PCIe switch 120 may be used as an intermediary to provide a set of virtual interrupt vectors that may then be translated to the interrupt vector associated with the destination host, and forwarded to the destination host.

Figure 2:
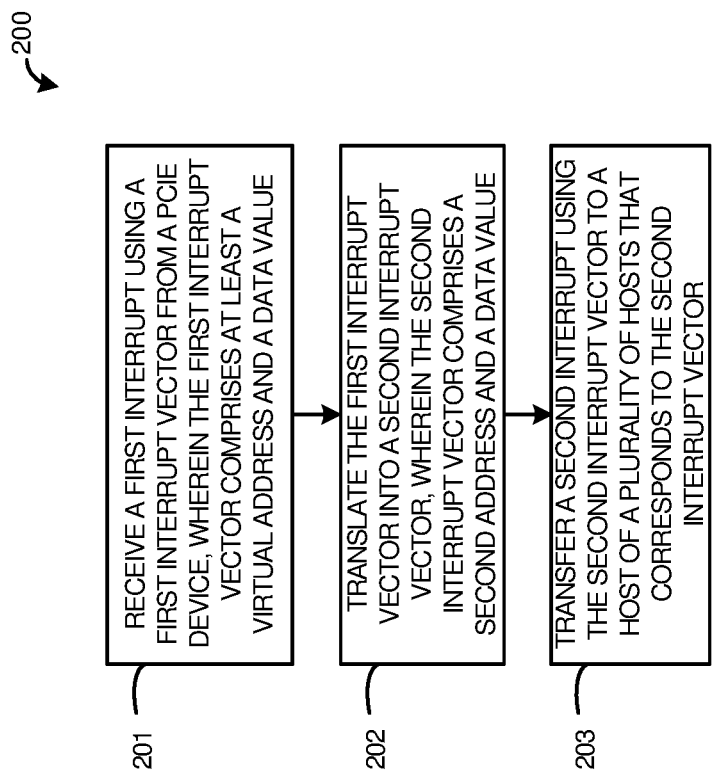
FIG. 2 illustrates an operation of a PCIe switch to manage interrupts from connected PCIe devices according to an implementation.

To further demonstrate the operations of virtual switch 120, FIG. 2 is provided. FIG. 2 illustrates an operation 200 of a PCIe switch to manage interrupts from connected PCIe devices according to an implementation. The processes of operation 200 are referenced parenthetically in the paragraphs that follow with reference to systems and elements of computing environment 100 of FIG. 1.

As described in FIG. 1, hosts 110-112 provide interrupt vectors to PCIe switch 120, wherein each interrupt vector includes an address portion and a data portion. As an example, host 110, may provide sixteen different interrupt vectors, wherein four of vectors may correspond to each of the PCIe devices. Thus, when an interrupt is required from one of the devices, host 110 will expect to receive an interrupt using one of the defined vectors. Here, instead of forwarding the defined vectors from the hosts to the PCIe devices, PCIe switch 120 will define virtual interrupt vectors to be supplied to the PCIe devices, wherein each virtual interrupt vector corresponds to an interrupt vector provided from hosts 110-112. These virtual vectors may each include a virtual address, wherein the virtual address is different than the corresponding address in the vector provided from one of hosts 110-112. For example, PCIe device 130 may receive virtual interrupt vectors that correspond to the interrupt vectors provided from hosts 110-112 for PCIe device 130. Consequently, rather than using the interrupt vectors from the hosts, each of the PCIe devices may use the single set of virtual interrupt vectors provided from the switch. Additionally, in some implementations, switch 120 may ensure that each of the virtual interrupt vectors are unique when they are provided to the corresponding PCIe devices.

As the vectors are maintained on the switch and the PCIe devices, operation 200 directs PCIe switch 120 to receive (201) a first interrupt using a first interrupt vector from a PCIe device, wherein the first interrupt vector comprises at least a virtual address and a data value. In response to receiving the first interrupt vector, PCIe switch 120 translates (202) the first interrupt vector into a second interrupt vector, wherein the second interrupt vector comprises a second address and a second data value, which may be equivalent or different from the original data value. In particular, because PCIe switch 120 maintains interrupt vectors received from hosts 110-112, PCIe switch 120 may be required to translate the virtual interrupt vectors received from the PCIe devices to the appropriate interrupt vectors associated with hosts 110-112. In some implementations, the virtual interrupt vectors may appear to the PCIe device as though the PCIe switch is the host for the device. Consequently, when a virtual interrupt vector is received at the PCIe switch, the virtual vector will require translation (often into a different address) into the interrupt vector associated with a host in hosts 110-112. Once translated, operation 200 includes transferring (203) a second interrupt using the second interrupt vector to a host of hosts 110-112 that corresponds to the second interrupt vector.

As an illustrative example, PCIe device 132 may deliver a first interrupt with a first address to PCIe switch 120. In response to the request, PCIe switch 120 may, based at least on the first address provided in the vector, translate the first interrupt vector into a second interrupt vector, with a different address, that was provided from one of hosts 110-112. Once translated, a second interrupt may be transferred using the second interrupt vector to the appropriate host communicatively coupled to PCIe switch 120. In some implementations, in making the translation of the interrupt vectors, PCIe switch 120 may use an offset to determine the interrupt vector associated with the host. For example, if a device provided an address "BBB80000," PCIe switch 120 may apply an offset to the first portion ("BBB8") and use the value after the offset to determine interrupt vector address for the host. Once the address is calculated using the offset, the host interrupt vector may be provided to the associated host.

In other implementations, the one or more data structures on PCIe switch 120 may match the virtual interrupt vectors to the corresponding interrupt vectors from the host. Accordingly, when a virtual interrupt vector is received from a PCIe device, at least one data structure may be searched to determine the associated host interrupt vector. Once identified, the interrupt vector may be provided to the associated host.

Figure 3:
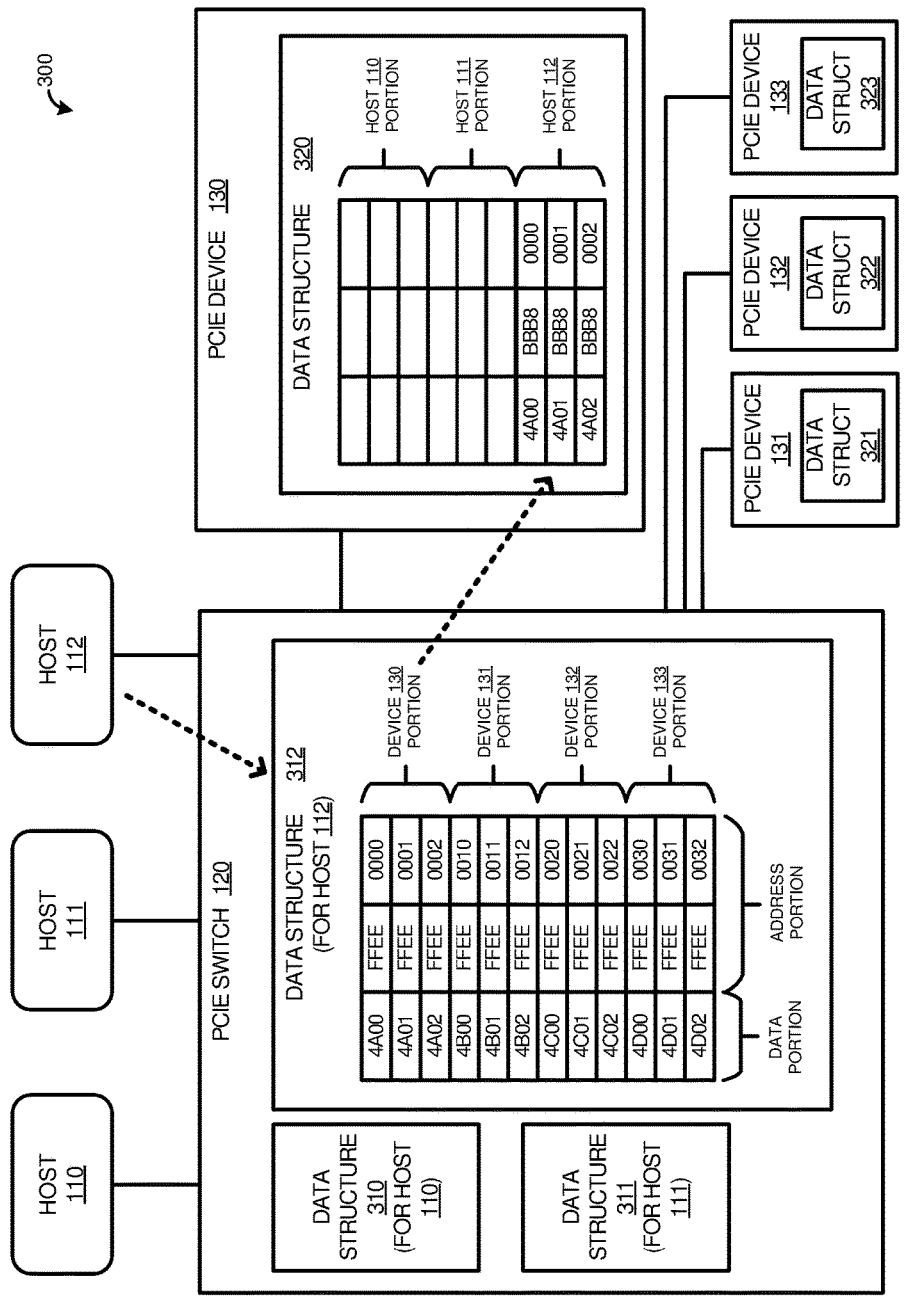
FIG. 3 illustrates a configuration of a PCIe switch and PCIe devices according to an implementation.

FIG. 3 illustrates a configuration 300 of a PCIe switch and PCIe devices according to an implementation. Configuration 300 uses systems and elements from computing environment 100 of FIG. 1, and further includes data structures 310-312 to be located on PCIe switch 120 and data structures 320-323 to be located on PCIe devices 130-133.

In operation, as hosts are connected to PCIe switch 120 and/or new PCIe devices are coupled to PCIe switch 120, data structures 310-312 are generated and updated to reflect the currently connected PCIe devices. In the particular example, of configuration 300, host 112 provides information to maintain data structure 312. This information includes interrupt vectors represented by individual rows in data structure 312, wherein the interrupt vectors comprise a data portion consisting of a first value and an address portion composing an upper and a lower value. As depicted, when the interrupt values are provided, the values are associated with particular PCIe devices. Thus, one or more vectors may be provided for each PCIe device in PCIe devices 130-133, wherein host 112 may identify the PCIe device associated with the interrupt vector based on the data value and address value for the vector.

As the interrupt vector values are provided from host 112, PCIe switch 120 further identifies virtual interrupt vectors and provides the virtual interrupt vectors to the PCIe devices. By providing the virtual interrupt vectors, PCIe switch 120 may appear as a "host" to the connected PCIe devices, and not require the individual PCIe devices to direct interrupts to a particular host of hosts 110-112. Here, data structure 320 is provided as an example, wherein virtual interrupt vectors are generated that correspond to the host interrupt vectors provided from host 112. In the present example, the first address portion "FFEE" is modified to "BBB8," to generate the virtual interrupt vectors, however, it should be understood that any portion of the address may be modified to generate the virtual interrupt vectors. In some implementations, in generating the address for the virtual interrupt vectors, the PCIe switch 120 may apply an offset to the address provided from the host. However, it should be understood that the address for the virtual interrupt vector may be generated in any manner, such as allocating predefined addresses, generating new addresses as required, or some other operation. Additionally, while the data portion provided from host 112 is supplied to data structure 320, it should be understood that PCIe switch 120 may modify data value in some examples. As a result, when an interrupt is received from the PCIe device that corresponds to a virtual interrupt vector, the address and the data value of the virtual interrupt vector may be translated into the values expected by the associated host.

As an illustrative example, when PCIe device 130 requires an interrupt of host 112, an interrupt using a first interrupt vector may be provided to PCIe switch 120. For example, a first interrupt vector with a data value of "4A00" may be used with an address of "BBB80000". In response to receiving the interrupt, PCIe switch 120 will determine a second interrupt vector associated with a host of hosts 110-112. Once determined, the second interrupt vector may be used in providing an interrupt to the appropriate host of hosts 110-112. In translating the first interrupt vector, PCIe switch 120 may translate the address portion of the vector from "BBB80000" to "FFEE0000," and provide an interrupt to host 112 using the translated address.

Although illustrated in the example of configuration 300 as configuring data structures 312 and data structure 320, it should be understood that similar operations may be applied in the creation and modification of data structures 310-311 and data structures 321-323. Further, while demonstrated in the example of FIG. 3 as using table data structures to manage the interrupt vectors, it should be understood that one or more data structure, including trees, linked lists, or some other data structure may be used in managing the interrupt vectors.

Figure 4:
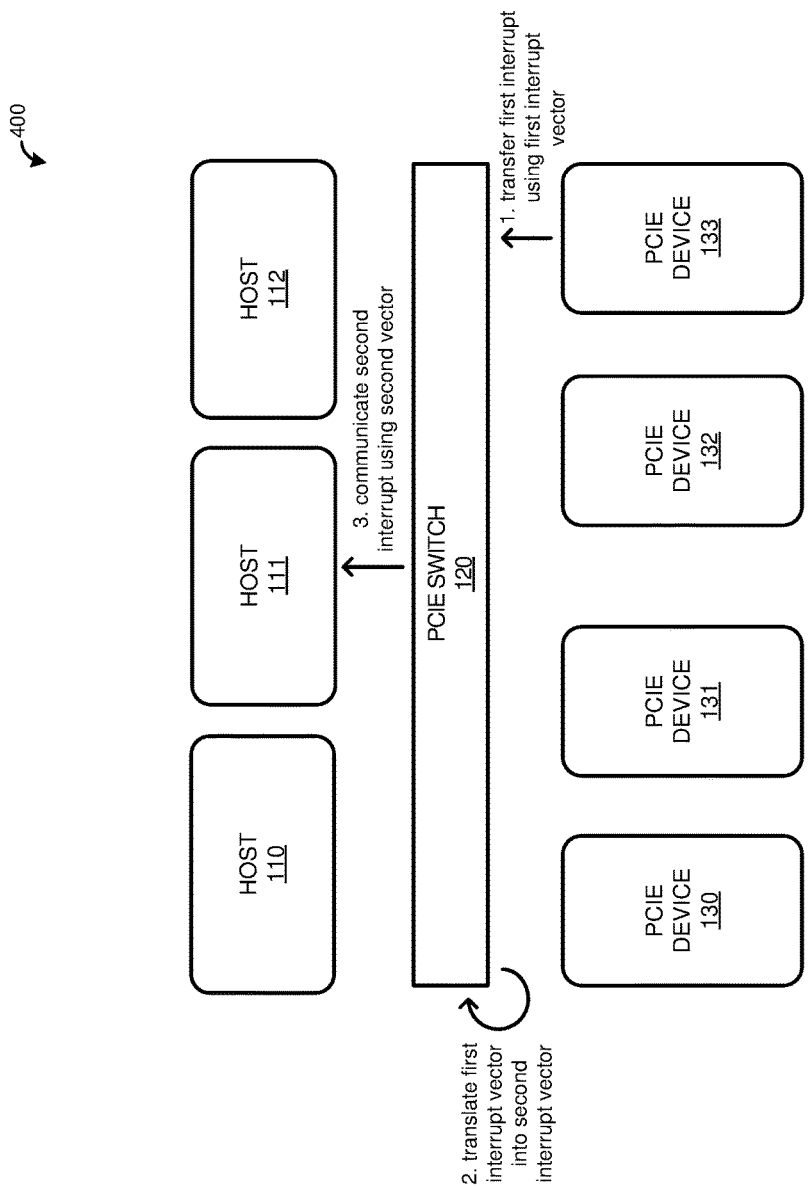
FIG. 4 illustrates an operational scenario of managing interrupts from PCIe devices according to an implementation.

FIG. 4 illustrates an operational scenario 400 of managing interrupts from PCIe devices according to an implementation. Operational scenario 400 includes systems and elements from computing environment 100 of FIG. 1. Although not illustrated in the example of operational scenario 400, it should be understood that one or more data structures may be maintained by PCIe switch 120 and each PCIe device in PCIe devices 130-133.

As depicted in operational scenario 400, PCIe device 133 transfers, at step 1, a first interrupt corresponding to a first interrupt vector to PCIe switch 120, wherein the interrupt vector may include at least a data portion and an address portion. When the interrupt is received, PCIe device 120, translates, at step 2, the first interrupt vector into second interrupt vector. This second interrupt vector may include a different addressing portion, and may further include a different data portion in some examples. In some implementations, to translate the first interrupt vector into the second interrupt vector, PCIe switch 120 may maintain at least one table or some other data structure to identify the second interrupt vector associated with the first interrupt vector. In other implementations, an offset may be applied to the address in the first interrupt vector to generate the second interrupt vector. Once the second address is determined for the second interrupt vector, a second interrupt using the second interrupt vector may be communicated, at step 3, to the host associated with the second interrupt vector. Here, the second interrupt vector identified by virtual switch 120 is associated with host 111. Consequently, the second interrupt vector is forwarded to host 111, wherein the interrupt may indicate a completion command or some other similar interrupt operation with respect to the PCIe device and the corresponding host.

Figure 5:
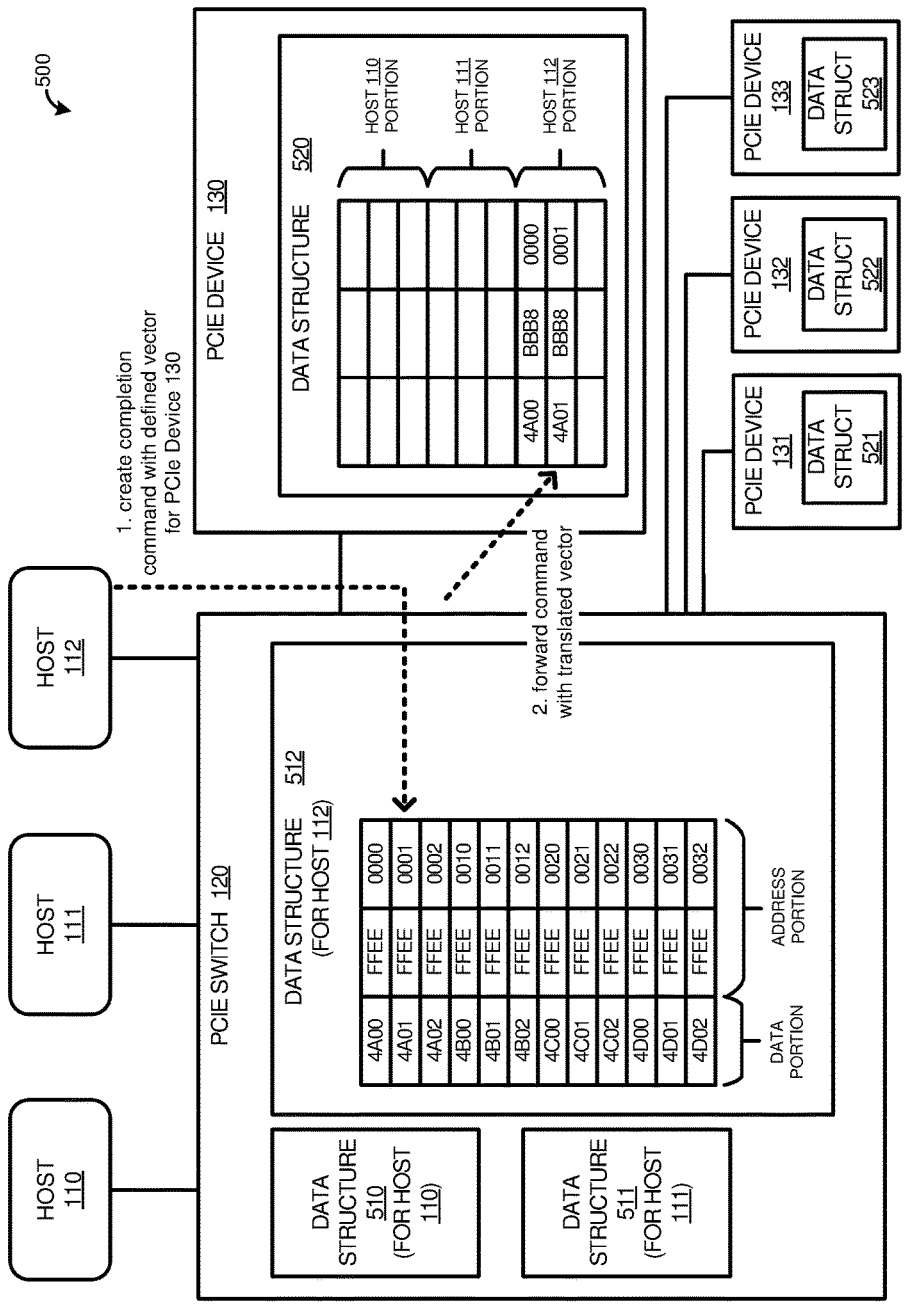
FIG. 5 illustrates an operational scenario of configuring data structures to manage interrupts from PCIe devices according to an implementation.

FIG. 5 illustrates an operational scenario 500 of configuring data structures to manage interrupts from PCIe devices according to an implementation. Operational scenario 500 includes systems and elements of computing environment 100 of FIG. 1, and further includes data structures 510-512, data structures 520-523. Operational scenario 500 is an example of generating interrupt vectors as required for completion commands with respect to data storage devices, such as NVMe devices.

In operational scenario 500, host 112 may generate, at step 1, a create completion queue command with a defined interrupt vector available for the host. In the present example, rather than writing the interrupt vector to the storage device immediately when the host provides the interrupt vectors to generate data structure 512, PCIe switch 120 may delay the allocation of virtual interrupt vectors until they are required by the hosts. Accordingly, in response to the request from host 112 with the vector with data value "4A01" and address values of "FFEE" and "0001" for PCIe device 130, PCIe switch may translate the interrupt vector into the appropriate virtual interrupt vector, and forward, at step 2, the vector to be implemented in data structure 520 on the device, wherein the virtual interrupt vector includes a different addressing portion than the addressing portion on PCIe switch 120. Thus, rather than writing the table on the device immediately, the tables on the individual PCIe devices may be updated as they are required for the hosts. This would permit host 112 to transfer a second queue creation request associated with a second interrupt vector, and add a second virtual interrupt vector as required for communication with PCIe device 130 or any other PCIe device of PCIe devices 131-133.

Once the virtual interrupt vectors are provided to the PCIe devices, the devices may then communicate the interrupts using the provided interrupt vectors when required to the virtual switch, which can then be forwarded to the appropriate host. Using the example provided in FIG. 5, PCIe device 130 may provide an interrupt corresponding to a vector with "4A01" and addressing portions "BBB8" and "0001." Responsive to the interrupt, PCIe switch 120 may translate the interrupt vector into a second interrupt vector corresponding to the host. This may be accomplished using the offset and/or data structure provided on the PCIe switch. Once translated the second interrupt vector may be provided to a corresponding host. Again, using the example in FIG. 5, a data value of "4A01" may be written to an address "FFEE0001." In some examples, by using an offset with the addressing portion, the switch may cause minimal delay in forwarding the interrupt to the desired host. In particular, software or logic of the switch may identify addressing attributes of the first vector, apply logic to the addressing attributes of the first vector to generate second addressing attributes, and forward a second vector with the second addressing attributes to the corresponding host.

In some implementations, PCIe switch 120 may be responsible for limiting the virtual interrupt vectors that are provided to each of the devices. In particular, to ensure that interrupt vectors are available on each of the devices, PCIe switch 120 may be configured with limits to the number of vectors available to each of the hosts. In some implementations, the same number of vectors may be available to each of the hosts. In other implementations, each of the hosts may be provided with various limits to the number of vectors available. For example, the hosts may be provided different numbers of interrupt vectors based on a quality of service associated with the host, which may be determined based on the application on the host, the user of the host, or some other similar quality of service determination.

Figure 6:
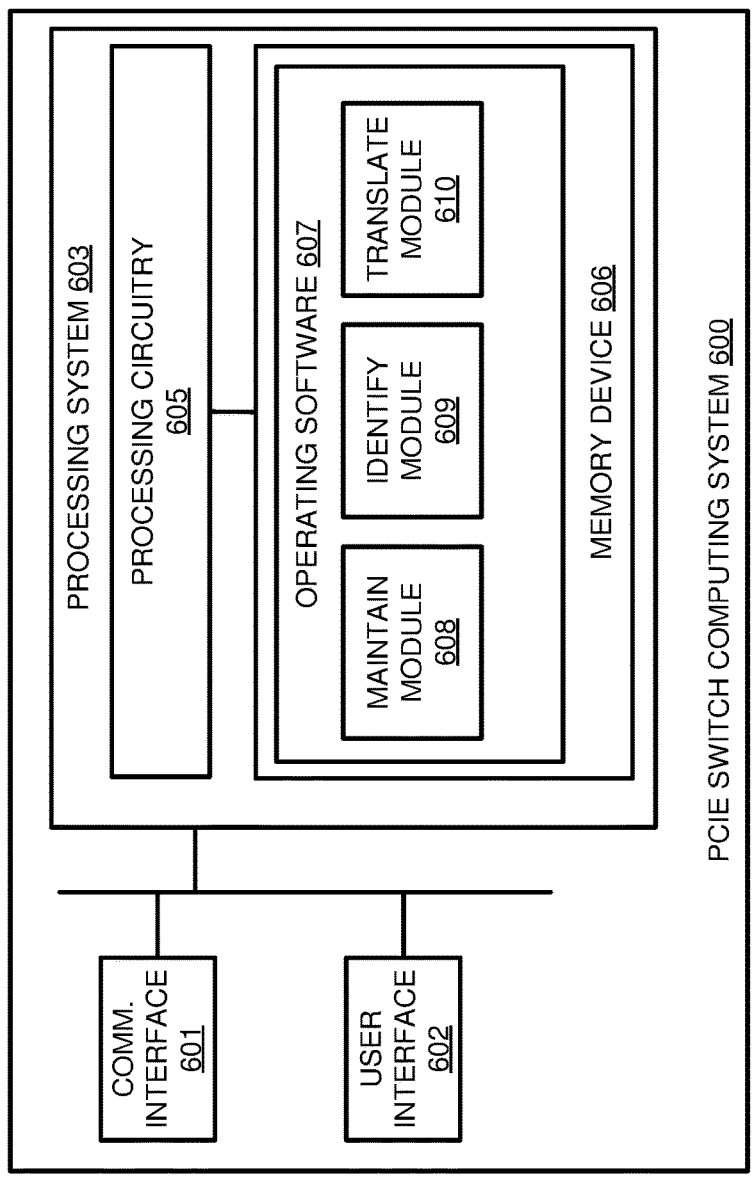
FIG. 6 illustrates a PCIe switch computing system to manage interrupts for PCIe devices according to an implementation.

FIG. 6 illustrates a PCIe switch computing system 600 to manage interrupts for PCIe devices according to an implementation. Computing system 600 is representative of any computing system or systems with which the various operational architectures, processes, scenarios, and sequences disclosed herein for a PCIe switch can be implemented. Computing system 600 is an example of PCIe switch 120, although other examples may exist. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, PCIe, optical networking, wireless protocols, communication signaling, or some other communication format—including combinations thereof. Communication interface 601 is configured to communicate with a plurality of host systems, such as serving computers, and a plurality of end PCIe devices, such as storage devices, co-processing units, graphical processing unites, or some other similar PCIe device.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device, but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes maintain module 608, identify module 609, and translate module 610, although any number of software modules may provide similar operations. Operating software 607 may further include an operating system, utilities, drivers, network interfaces, applications, or some other type of software. When executed by processing circuitry 605, operating software 607 directs processing system 603 to operate computing system 600 as described herein.

In at least one implementation, maintain module 608 is used to maintain one or more data structures for interrupt vectors from hosts communicatively coupled to computing system 600 using communication interface 601. In particular, when a host or a new PCIe device is coupled to computing system 600, the hosts may be responsible for providing interrupt vectors, which are used by a PCIe device when an interrupt is required, such as a completion command interrupt. In addition to receiving the interrupt vectors from the hosts, maintain module 608 is further responsible for translating the interrupt vectors into virtual interrupt vectors that can be provided to individual PCIe devices. For example, rather than directly providing the interrupt vectors from the hosts, which may include duplicates when received from multiple hosts, each of the interrupt vectors may be translated into a unique virtual interrupt vector. This translation may be accomplished via an offset that can be applied to at least a portion of the addressing for the interrupt vector, may be replacement values that are used to replace a portion of the interrupt vectors (such as the address of the vectors), or may comprise any other mechanism to provide a unique virtual interrupt vector to the corresponding PCIe device. Once provided, the PCIe device may cache the virtual interrupt vectors and use the virtual interrupt vectors when service is required with a host.

As the interrupt vectors and the virtual interrupt vectors are maintained, identify module 609 directs processing system 603 to identify or receive a first interrupt corresponding to a first interrupt vector from a PCIe device, wherein the interrupt vector comprises at least a virtual address and a first data value. In response to receiving the first interrupt via communication interface 601, translate module 610 directs processing system 603 to translate the first interrupt vector into a second interrupt vector, wherein the second interrupt vector comprises a second address and a second data value. In some implementations, computing system 600 may maintain one or more data structures that can be used to match attributes of the first interrupt vector (virtual interrupt vector) with attributes of the second interrupt vector. In other implementations, computing system 600 may apply an offset to at least a portion of the virtual address to derive the second address for the second interrupt vector. In some examples, the second data value may be an equal value to that supplied by the first interrupt vector. However, it should be understood that the second data value may be a different value than the first value in some examples.

Once the second interrupt vector is determined via the translation process, translation module 610 further directs processing system 603 to transfer a second interrupt using the second interrupt vector to a host that corresponds to the second interrupt vector. In at least one implementation, at least one table (or some other data structure) may be used to translate the first address and the first value from the first interrupt vector, into a second address and a second value for the second interrupt vector. Additionally, based on the identified values for the second interrupt vector, computing system 600 may identify a relevant host from a plurality of hosts coupled to the switch, and transfer the required interrupt to the identified host.

Although demonstrated in the examples herein as translating a first address in the first interrupt vector to a second address in the second interrupt vector, it should be understood that the address may not necessarily be the value that is translated by the PCIe switch. In particular, rather than translating the address fields for the interrupt vector, the data value may be modified in a way to distinctly identify interrupts for each of the hosts. Consequently, when a first interrupt vector is received from a PCIe device, the translation mechanism of the PCIe switch may translate the data value from the first interrupt vector into a second data value for a second interrupt vector. Once translated, the second interrupt vector may be forwarded to the associated host.

Returning to the elements of FIG. 1, hosts 110-112 may each comprise communication interfaces, network interfaces, processing systems, computer systems, microprocessors, storage systems, storage media, or some other processing devices or software systems, and can be distributed among multiple devices. Hosts 110-112 can each include software such as an operating system, logs, databases, utilities, drivers, networking software, and other software stored on a computer-readable medium. Hosts 110-112 may each comprise a serving computing system, a desktop computing system, or some other similar computing system capable of PCIe communication with supported devices.

PCIe switch 120 may comprise communication interfaces, network interfaces, processing systems, computer systems, microprocessors, storage systems, storage media, or some other processing devices or software systems, and can be distributed among multiple devices. Examples of virtual computing service 150 can include software such as an operating system, logs, databases, utilities, drivers, networking software, and other software stored on a computer-readable medium.

PCIe devices 130-133 may comprise storage devices, such as NVMe storage devices, graphical processing units, co-processing units, networking card, or some other similar end PCIe device. PCIe devices 130-133 may each comprise one or more communication interfaces, network interfaces, processing systems, microprocessors, storage systems, storage media, or some other processing devices or software systems.

PCIe switch 120 provides communication between hosts 110-112 and PCIe devices 130-133 using PCIe bus lanes, wherein each host of hosts 110-112 is communicatively coupled to the switch using a PCIe interface, and each PCIe device of PCIe devices 130-133 is communicatively coupled to the switch using a PCIe interface.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A computing apparatus comprising:
one or more computer readable storage media;
a processing system operatively coupled with the one or more computer readable storage media; and
program instructions stored on the one or more computer readable storage media to operate a Peripheral Component Interconnect Express (PCIe) switch that, when read and executed by the processing system, direct the processing system to at least:
receive a first interrupt corresponding to a first interrupt vector from a PCIe device, wherein the first interrupt vector comprises at least a virtual address and a first data value;
translate the first interrupt vector into a second interrupt vector, wherein the second interrupt vector comprises a second address and a second data value; and
transfer a second interrupt using the second interrupt vector to a host of a plurality of hosts that corresponds to the second interrupt vector.

2. The computing apparatus of claim 1, wherein the program instructions further direct the processing system to:
maintain at least one data structure for the plurality of hosts, wherein the at least one data structure comprises a plurality of interrupt vectors received from the plurality of hosts for one or more PCIe devices coupled to the PCIe switch to provide interrupts to the plurality of hosts.

3. The computing apparatus of claim 2, wherein the program instructions further direct the processing system to:
for each interrupt vector in the plurality of interrupt vectors received from the plurality of hosts, provide a virtual interrupt vector to a corresponding PCIe device in the one or more PCIe devices coupled to the PCIe switch, wherein the virtual interrupt vector comprises at least a different address than the interrupt vector.

4. The computing apparatus of claim 1, wherein the PCIe device comprises a data storage device.

5. The computing apparatus of claim 1, wherein the PCIe device comprises a Non-Volatile Memory express (NVMe) device.

6. The computing apparatus of claim 1, wherein the plurality of hosts comprises a plurality of computers.

7. The computing apparatus of claim 1, wherein the program instructions to translate the first interrupt vector into a second interrupt vector direct the processing system to apply an addressing offset to the first interrupt vector to generate the second interrupt vector.

8. The computing apparatus of claim 1, wherein the first data value is equivalent to the second data value.

9. The computing apparatus of claim 1, wherein the first data value is different than the second data value.

10. A system comprising:
one or more Peripheral Component Interconnect Express (PCIe) devices; and
a PCIe switch configured to:
receive a first interrupt corresponding to a first interrupt vector from a PCIe device, wherein the first interrupt vector comprises at least a virtual address and a first data value;
translate the first interrupt vector into a second interrupt vector, wherein the second interrupt vector comprises a second address and a second data value; and
transfer a second interrupt using the second interrupt vector to a host of a plurality of hosts that corresponds to the second interrupt vector.

11. The system of claim 10, wherein the PCIe switch is further configured to maintain at least one data structure for the plurality of hosts, wherein the at least one data structure comprises a plurality of interrupt vectors received from the plurality of hosts for one or more PCIe devices coupled to the PCIe switch to provide interrupts to the plurality of hosts.

12. The system of claim 11, wherein the PCIe switch is further configured to, for each interrupt vector in the plurality of interrupt vectors received from the plurality of hosts, provide a virtual interrupt vector to a corresponding PCIe device in the one or more PCIe devices coupled to the PCIe switch, wherein the virtual interrupt vector comprises at least a different address than the interrupt vector.

13. The system of claim 10, wherein the PCIe device comprises a data storage device.

14. The system of claim 10, wherein the PCIe device comprises a Non-Volatile Memory express (NVMe) device.

15. The system of claim 10, wherein the plurality of hosts comprises a plurality of computers.

16. The system of claim 10, wherein the PCIe switch configured to translate the first interrupt vector into a second interrupt vector is configured to apply an addressing offset to the first interrupt vector to generate the second interrupt vector.

17. The system of claim 10, wherein the first data value is equivalent to the second data value.

18. The system of claim 10, wherein the first data value is different than the second data value.

19. An apparatus comprising:

means for receiving a first interrupt corresponding to a first interrupt vector from a PCIe device, wherein the first interrupt vector comprises at least a virtual address and a first data value;

means for translating the first interrupt vector into a second interrupt vector, wherein the second interrupt vector comprises a second address and a second data value; and means for transferring a second interrupt using the second interrupt vector to a host of a plurality of hosts that corresponds to the second interrupt vector.

20. The apparatus of claim 19, further comprising:

means for maintaining at least one data structure for the plurality of hosts, wherein the at least one data structure comprises a plurality of interrupt vectors received from the plurality of hosts for one or more PCIe devices coupled to a PCIe switch to provide interrupts to the plurality of hosts; and means for providing, for each interrupt vector in the plurality of interrupt vectors received from the plurality of hosts, a virtual interrupt vector to a corresponding PCIe device in the one or more PCIe devices coupled to the PCIe switch, wherein the virtual interrupt vector comprises at least a different address than the interrupt vector.

* * * * *